United States Patent
Fu et al.

(10) Patent No.: US 10,280,279 B2
(45) Date of Patent: May 7, 2019

(54) CONDUCTIVE POLYMER COMPOSITION, CONDUCTIVE POLYMER SHEET, ELECTRICAL DEVICE, AND THEIR PREPARATION METHODS

(71) Applicants: Littelfuse Electronics (Shanghai) Co., Ltd., Shanghai (CN); Littelfuse, Inc., Chicago, IL (US)

(72) Inventors: Yingsong Fu, Shanghai (CN); Jianhua Chen, Sunnyvale, CA (US); Mingjun Jin, Shanghai (CN); Zhiyong Zhou, Shanghai (CN); Wei Zheng, Shanghai (CN); Cheng Hu, Shanghai (CN)

(73) Assignees: LITTELFUSE ELECTRONICS (SHANGHAI) CO., LTD, Shanghai (CN); LITTELFUSE, INC., Chicago, IL (US)

( * ) Notice: Subject to any disclaimer, the term of this patent is extended or adjusted under 35 U.S.C. 154(b) by 0 days.

(21) Appl. No.: 15/739,909

(22) PCT Filed: Jun. 30, 2016

(86) PCT No.: PCT/CN2016/087896
§ 371 (c)(1),
(2) Date: Dec. 26, 2017

(87) PCT Pub. No.: WO2017/000899
PCT Pub. Date: Jan. 5, 2017

(65) Prior Publication Data
US 2018/0186964 A1  Jul. 5, 2018

(30) Foreign Application Priority Data

Jun. 30, 2015 (CN) .......................... 2015 1 0371968

(51) Int. Cl.
*C08K 3/14* (2006.01)
*C08L 23/06* (2006.01)
(Continued)

(52) U.S. Cl.
CPC .................. *C08K 3/14* (2013.01); *C08K 3/08* (2013.01); *C08L 23/06* (2013.01); *C08L 23/08* (2013.01);
(Continued)

(58) Field of Classification Search
None
See application file for complete search history.

(56) References Cited

U.S. PATENT DOCUMENTS

| 5,106,538 A | * | 4/1992 | Barma | ................. C08K 3/0033 252/503 |
| 5,247,277 A | * | 9/1993 | Fang | ..................... H01C 1/146 338/204 |

(Continued)

FOREIGN PATENT DOCUMENTS

| CN | 1150314 A | 5/1997 |
| CN | 103594215 A | 2/2014 |

(Continued)

OTHER PUBLICATIONS

International Search Report received for PCT Patent Application No. PCT/CN2016/087896, dated Aug. 29, 2016, 2 pages (machine translation).

*Primary Examiner* — Katie L. Hammer (57) ABSTRACT

The present invention provides a conductive polymer composition, a conductive polymer sheet, an electrical device, and their preparation methods. The conductive polymer composition of the present invention includes a polymer and a conductive powder at a volume ratio of 35:65 to 65:35. The polymer includes at least one semicrystalline polymer
(Continued)

selected from polyolefin, a copolymer of at least one olefin and at least one non-olefinic monomer copolymerizable therewith, and a thermoformable fluorine-containing polymer. The stated conductive powder includes at least one powder of a transition metal carbide, a transition metal carbon silicide, a transition metal carbon aluminide, and a transition metal carbon stannide. And the stated size distribution of the conductive powder satisfies: $20>D_{100}/D_{50}>6$, where $D_{50}$ denotes a corresponding particle size when a cumulative particle-size distribution percent in the conductive powder reaches 50%, and $D_{100}$ denotes a maximum particle size. The stated conductive polymer composition has excellent processability, and can be used for preparing a PPTC device with ultralow resistance and stability in air without an oxygen barrier coating.

27 Claims, 7 Drawing Sheets

(51) Int. Cl.
| | |
|---|---|
| *C08K 3/08* | (2006.01) |
| *C08L 23/08* | (2006.01) |
| *C08L 23/12* | (2006.01) |
| *C08L 23/16* | (2006.01) |
| *C08L 27/12* | (2006.01) |
| *H01C 7/02* | (2006.01) |
| *H01B 1/20* | (2006.01) |

(52) U.S. Cl.
CPC .............. *C08L 23/12* (2013.01); *C08L 23/16* (2013.01); *C08L 27/12* (2013.01); *H01B 1/20* (2013.01); *H01C 7/02* (2013.01); *H01C 7/028* (2013.01); *C01P 2004/03* (2013.01); *C08F 2500/17* (2013.01); *C08F 2500/19* (2013.01)

(56) References Cited

U.S. PATENT DOCUMENTS

| | | | |
|---|---|---|---|
| 8,368,504 B1* | 2/2013 | Chen | H01C 7/02 |
| | | | 252/511 |
| 2008/0116424 A1* | 5/2008 | Bandyopadhyay | C08K 3/08 |
| | | | 252/513 |
| 2011/0152435 A1* | 6/2011 | Morishita | B82Y 30/00 |
| | | | 524/504 |
| 2013/0094116 A1* | 4/2013 | Yang | H01B 1/20 |
| | | | 361/93.7 |
| 2014/0306605 A1* | 10/2014 | Lo | H01C 7/028 |
| | | | 315/71 |

FOREIGN PATENT DOCUMENTS

| | | |
|---|---|---|
| EP | 0862192 A1 | 9/1998 |
| JP | 2003318008 A | 11/2003 |
| JP | 2005183750 A | 7/2005 |

* cited by examiner

| TUNGSTEN CARBIDE TYPE | C.T. (%) | RESISTIVITY ($\mu\Omega \cdot cm$) |
|---|---|---|
| GUANGDONG - 17 | 5.89 | 62 |
| GUANGDONG - 18 | 6.11 | 110 |
| XIAMEN - 20 | 5.9 | 19 |
| XIAMEN - 46 | 6.15 | 49 |

CONDUCTIVE POLYMER COMPOSITION, CONDUCTIVE POLYMER SHEET, ELECTRICAL DEVICE, AND THEIR PREPARATION METHODS

CROSS-REFERENCE TO RELATED APPLICATIONS

This application is a national phase claiming the benefit of and priority to International Patent Application No. PCT/CN2016/087896, entitled "CONDUCTIVE POLYMER COMPOSITION, CONDUCTIVE POLYMER SHEET, ELECTRICAL DEVICE, AND THEIR PREPARATION METHODS", filed Jun. 30, 2016, which claims priority to Chinese Patent Application No. 201510371968.X filed on Jun. 30, 2015, both of which are hereby incorporated by reference in their entireties.

TECHNICAL FIELD

The present invention relates to a conductive polymer composition, a conductive polymer sheet, an electrical device, and their preparation methods, and in particular, to a conductive polymer composition that can be used for preparing a device having air stability, ultralow resistance, polymer positive temperature coefficient (PPTC) characteristics and a conductive polymer sheet and an electrical device that are formed using same.

BACKGROUND ART

A PPTC is an overcurrent protection device having a positive temperature coefficient characteristic. It functions when connected in series in a circuit. When current in circuit is normal, the PPTC is in a low-resistance state. When the circuit is short circuited or overloaded, the PPTC transits to a high-resistance state. In this way, the circuit is rapidly and accurately limited and protected. When an out-of-order is eliminated, the PPTC is automatically restored to a low-resistance state.

With the development of the modern electronics industry, the requirements of PPTC components become increasingly high. PPTC components develop in a trend to have smaller sizes, lower resistance, and more stable performance. For low-resistance PPTC components, two types of PPTC materials presently dominate. The first type is a metal-based (for example, nickel or copper powder) PPTC material. The metal-based PPTC component has advantages such as low resistance and easy processability. However, the metal-based PPTC material is easily oxidized during production and processing and subsequent use. As a result, the resistance of a PPTC component rises to cause the PPTC component to fail (keeps decreasing current). A second type is a carbide-base (for example, titanium carbide or tungsten carbide) PPTC material. A carbide-base PPTC component has advantages of low resistance and being stable in air (is not easily oxidized in air). However, a carbide-base PPTC material has low processing performance. It is still a great challenge to use a carbide-base PPTC material to produce a PPTC device with stable quality and ultralow resistance (resistivity is less than 200 $\mu\Omega\cdot cm$).

SUMMARY OF THE INVENTION

Problems to be Solved by the Invention

The present invention aims at resolving existing problem in a carbide-based PPTC material, so as to obtain a PPTC device with ultralow resistance, excellent processing performance, and stable electrical performance.

Means for Solving the Problems

To achieve the above-mentioned objective of the present invention, one aspect of the present invention provides a conductive polymer composition, including a polymer and a conductive powder at a volume ratio of 65:35 to 35:65, where the polymer includes at least one semicrystalline polymer selected from polyolefin, a copolymer of at least one olefin and at least one non-olefinic monomer copolymerizable therewith, and a thermoformable fluorine-containing polymer. The stated conductive powder includes at least one powder of a transition metal carbide, a transition metal carbon silicide, a transition metal carbon aluminide, and a transition metal carbon stannide. Furthermore, the stated size distribution of the conductive powder satisfies: $20>D_{100}/D_{50}>6$, where $D_{50}$ denotes a corresponding particle size when a cumulative particle-size distribution percent in the conductive powder reaches 50%, and $D_{100}$ denotes a maximum particle size.

The present invention further provides a conductive polymer sheet, obtained by melting and extruding the conductive polymer composition of the present invention.

The present invention also provides an electrical device, including a first electrode, a second electrode, and a conductive polymer layer sandwiched between the first and second electrodes, where the conductive polymer layer is formed from the conductive polymer composition of the present invention.

Another aspect of the present invention provides a method for obtaining a positive temperature coefficient polymer material with air stability and ultralow resistance. The method includes: blending a polymer and a conductive powder at a volume ratio of 65:35 to 35:65, where the polymer includes at least one semicrystalline polymer selected from polyolefin, a copolymer of at least one olefin and at least one non-olefinic monomer copolymerizable therewith, and a thermoformable fluorine-containing polymer. The stated conductive powder includes at least one powder of a transition metal carbide, a transition metal carbon silicide, a transition metal carbon aluminide, and a transition metal carbon stannide. And the stated size distribution of the conductive powder satisfies: $20>D_{100}/D_{50}>6$, where $D_{50}$ denotes a corresponding particle size of 50% in particle-size distribution, and $D_{100}$ denotes a maximum particle size.

The present invention further relates to a method for preparing an overcurrent protection device having a positive temperature coefficient characteristic and air stability. The stated method includes extruding a positive temperature coefficient polymer material obtained by using the above-mentioned method, and laminating the first and second electrodes.

Favorable Effects of the Invention

According to the present invention, problems of poor PPTC processability and relatively high resistance of carbides can be resolved, and a PPTC device with ultralow resistance and air stability without an oxygen barrier coating can be prepared.

BRIEF DESCRIPTION OF THE DRAWINGS

Multiple embodiments of the present invention are described in detail with reference to the following accompanying drawings, to help understand the present invention more comprehensively, where.

DETAILED DESCRIPTION OF EMBODIMENTS OF THE INVENTION

As discussed above, the present invention is to provide an ultralow-resistance PPTC material having excellent processability and air stability, and a preparation method, a PPTC sheet and a PPTC device prepared by using the preparation method.

A PPTC device is made by irradiating and punching a PPTC sheet (obtained by means of composite blending of a conductive powder and a semicrystalline polymer, granulation, and extrusion processing) and performing soldering and assembling. To obtain a low-resistance PPTC device, the selection of a conductive powder is highly critical.

Conductive carbon black, carbide powder, and metal powder are commonly used conductive powders for PPTC devices. Their powder resistivity is ~$1.0\times10^{-3}$ ohm·cm, ~$1.0\times10^{-5}$ ohm·cm, and ~$1.0\times10^{-6}$ ohm·cm, respectively. Based on resistivity data, low resistance may be obtained by using the carbide powder and the metal powder as conductive materials. Ultralow initial resistance may be obtained by using metal powder as conductive powder.

An ultralow-resistivity PPTC sheet (the resistivity is less than 200 μΩ·cm) may be obtained by blending the nickel powder Inco255 as a conductive powder (a volume ratio of the nickel powder is 40%) and the nickel powder Inco255 and polyethylene, and has excellent processability. During extrusion processing, the size and morphology of the powder change greatly. The nickel powder Inco255 has a branch-shaped structure before processing, and becomes a quasi-spherical structure after processing because nickel powder is soft. During processing, storage, and use, nickel powder may be oxidized resulting in rising resistance of a PPTC device. An excellent oxygen-barrier coating may be applied to an exposed area of a chip to isolate oxygen, so as to prevent oxidation of a metal powder. However, the process of applying a coating is complex, and it is difficult to detect a device that fails to be perfectly covered.

Transition metal carbides have extremely high melting points, low coefficients of friction, chemical inertness, oxidation resistance, and desirable thermal and electrical conductivity, are widely applied in the electronics industry, and gradually show their important effects. By using a composite of a carbide material (for example, titanium carbide or tungsten carbide) and general-purpose polyolefin (for example, high-density polyethylene HDPE, low-density polyethylene LDPE, ethylene-vinyl acetate EVA), a PPTC which is stable in air may be obtained. However, a normal carbide has a polygonal shape (for example, titanium carbide) and high hardness (a carbide is about 10 times as hard as a nickel material), and is difficult to process during dry mixing, extrusion, and lamination. The results are that a screw and a barrel are severely worn, it is difficult to control the thickness of a finished product, and powders are locally non-uniformly dispersed in a resin substrate, resulting in large discrepancies between batches of finished products and unstable performance.

According to an embodiment of the present invention, the resistivity of a conductive powder may be controlled by adjusting the size distribution of conductive powder. It is unexpectedly found that, relatively wide size distribution favors lower resistance by keeping more or less the same average size. For example, when $D_{100}/D_{50}>6$, ultralow resistivity (less than 200 μΩ·cm) may be obtained, where $D_{100}$ denotes a maximum particle size, and $D_{50}$ denotes a corresponding particle size when a cumulative particle-size distribution percent in the conductive powder reaches 50%. The physical meaning of $D_{50}$ is that particles whose particle sizes are greater than $D_{50}$ account for 50%, and particles whose particle sizes are less than $D_{50}$ also account for 50%. $D_{50}$ is also referred to as a median diameter or a median particle size.

According to an embodiment of the present invention, the surface morphology of a conductive powder also significantly affects the flowability of a carbide powder and processability of a composite of the conductive powder and a polymer. When a quasi-spherical conductive powder is chosen, as compared with a non-spherical carbide, the processability can be significantly improved. Moreover, under the same processing conditions, increasing the conductive powder quantity can reduce the resistance of the PPTC sheet.

According to an embodiment of the present invention, for a transition metal carbide, the resistance is directly related to the carbon content in the carbide. Under a condition with similar particle size distribution, a carbide having lower carbon content has lower resistivity. For example, when the carbon content T.C. in tungsten carbide<6.0%, particularly, when the content T.C. is about 5.90%, low resistance may be obtained. When T.C.>6.0%, the resistivity is slightly higher.

Based on the above-mentioned findings, the present invention provides a conductive polymer composition, a conductive polymer sheet, an electrical device, and their preparation methods.

Specifically, according to an aspect of the present invention, a conductive polymer composition is provided, including a polymer and a conductive powder at a volume ratio of 65:35 to 35:65 The polymer includes at least one semicrystalline polymer selected from polyolefin, a copolymer of at least one olefin and at least one non-olefinic monomer copolymerizable therewith, and a thermoformable fluorine-containing polymer. The stated conductive powder includes at least one of a transition metal carbide, a transition metal carbon silicide, a transition metal carbon aluminide or a transition metal carbon stannide. And the stated size distribution of the conductive powder satisfies: $20>D_{100}/D_{50}>6$.

The polymer in the composition, according to an embodiment of the present invention, includes at least one semicrystalline polymer selected from polyolefin, a copolymer of at least one olefin and at least one non-olefinic monomer copolymerizable therewith, and a thermoformable fluorine-containing polymer. Wherein, the polyolefin includes polypropylene, polyethylene (including high-density polyethylene, middle-density polyethylene, low-density polyethylene, and linear low-density polyethylene) or a copolymer of ethylene and propylene. The stated copolymer includes ethylene-vinyl acetate copolymer, ethylene-vinyl alcohol copolymer, ethylene-methyl acrylate copolymer, ethylene-ethyl acrylate copolymer, ethylene-acrylate copolymer, and ethylene-butyl acrylate copolymer. The stated thermoformable fluorine-containing polymer includes polyvinylidene fluoride, ethylene/tetrafluoroethylene copolymer, and the alike.

The conductive powder, according to an embodiment of the present invention, includes at least one of a transition metal carbide, a transition metal carbon silicide, a transition metal carbon aluminide or a transition metal carbon stannide. For example, titanium carbide, tungsten carbide, titanium silicon carbide, titanium aluminum carbide or titanium tin carbide. Titanium silicon carbide, titanium aluminum carbide or titanium tin carbide have property similar to tungsten carbide.

The above-mentioned conductive powder preferably has a quasi-spherical shape. Herein, the term "quasi-spherical" includes an ideal spherical shape and the alike. In the present invention, the term "quasi-spherical" and "spherical" may be used interchangeably.

The conductive powder having a quasi-spherical shape of the present invention may be obtained by using multiple methods, and includes, but is not limited to, centrifugal rotation, rotary atomization, centrifugal rotation and condensation, induction or resistance heating spheroidization, plasma spheroidization or gas atomization.

According to an embodiment of the present invention, the average particle size of the conductive powder may be from 0.1 μm to 50 μm. In some implementation solutions, the size of the conductive powder satisfies: $D_{50}<5$ μm, and $D_{100}<50$ μm.

To obtain ultralow resistivity (less than 200 μΩ·cm), the conductive powder, according to an embodiment of the present invention, preferably has wider size distribution. Preferably, $D_{100}/D_{50}>6$. The upper limit value of $D_{100}/D_{50}$ may be 20, and preferably, 10.

When two conductive powders are mixed to satisfy $D_{100}/D_{50}>6$, a similar conclusion may also be drawn in the present invention.

In addition, because a transition metal generally has a variable valence state. In its carbides, a M×C phase may exist (M denotes a transition metal, and x is greater than 1). The presence of this M×C phase reduces the total carbon content in the carbide. Take tungsten carbide (WC) as an example. Theoretical total carbon content in pure WC is 6.18%. However, a WC phase usually contains $W_2C$ ($W_2C$ is a sub-stable state phase). When WC contains a small amount of $W_2C$, the total carbon content is reduced. It is found in the present invention that under a condition of similar particle-size distribution, a carbide having lower carbon content has slightly low resistivity. For example, when the carbon content T.C. in tungsten carbide<6.0% (where T.C. is 100%×C/WC by mass), particularly, when the content T.C. is about 5.90%, low resistance may be obtained. When T.C.>6.0%, the resistivity is slightly higher. For titanium carbide (TiC), based on a stoichiometric ratio, the total carbon content should be 20.03%. And when the total carbon content is between 19.0% and 19.5%, the resistance is lower. Therefore, when the total carbon content is less than a stoichiometric ratio by 3% to 5%, a low-resistance system is favorably obtained. Therefore, in the present invention, the carbon content in preferable transition metal carbide is less than theoretical total carbon content in a transition metal carbide MC (M is a transition metal element) of a stoichiometric ratio by 2% to 5%, preferably, by 3% to 5%.

The content of free carbon (F.C.) should be as low as possible, and it is generally required that F.C.<0.3%, and most preferably, less than 0.05%.

In the present invention, to enable conductive powder to be uniformly dispersed in polymer and ensure certain low resistance, a volume ratio of the polymer to the conductive powder may be 65:35 to 35:65, preferably 60:40 to 40:60, and more preferably 55:45 to 45:55. Most preferably, the polymer and the conductive powder are mixed at an approximately equal volume ratio.

The conductive polymer composition, according to this embodiment of the present invention, may contain a component other than the above-mentioned polymer and the conductive powder. For example, an inorganic filler or other polymer materials, and an additive such as a processing aid and a lubricant. The prerequisite is not to impair the low resistance and the processability of the conductive polymer composition in the present invention.

The present invention further provides a conductive polymer sheet, obtained by melting and extruding the conductive polymer composition of the present invention.

The conductive polymer sheet, according to an embodiment of the present invention, may be used as PPTC sheet and used for preparing a PPTC device.

Specifically, the conductive polymer sheet may be obtained by compounding various components of the conductive polymer composition, granulation, and then extrusion processing, according to an embodiment of the present invention.

Preferably, the resistivity of the conductive polymer sheet, according to an embodiment of the present invention, is less than 200 μΩ·cm.

The present invention also provides an electrical device, including a first electrode, a second electrode, and a conductive polymer layer sandwiched between the first and second electrodes, where the conductive polymer layer is formed from the conductive polymer composition of the present invention.

Preferably, the above-mentioned conductive polymer layer may be formed from the conductive polymer sheet, according to the present invention, and further, the resistivity of the conductive polymer sheet is less than 200 μΩ·cm.

The conductive polymer composition, according to an embodiment of the present invention, may be used for preparing an electrical device, for example, a circuit protection device, a heater, a resistor, and a thermal indicator. Although a circuit protection device may have any shape, a particularly useful circuit protection device includes two layered electrodes, preferably, metal foil electrodes, and the conductive polymer layer sandwiched between the electrodes.

Figure 8A:
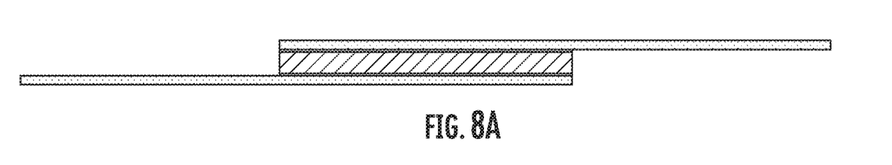
FIG. 8 shows a PPTC device and a resistance-temperature (RT) curve according to the present invention.

A device generally includes a lead, and the lead is fixed, for example, soldered or fused to an electrode. The lead is suitable for being inserted in or mounted on a printed circuit board. The circuit protection device is especially suitable for, for example, a battery protection application, where the lead exists in the form of a belt or strip and is, for example, electrically connected to a substrate of a battery terminal (as shown in FIG. 8A).

When an electrical device, according to an embodiment of the present invention, is used as a circuit protection device, the stated electrical device is an overcurrent protection device having a positive temperature coefficient characteristic. And the resistivity of the overcurrent protection device is less than 200 μΩ·cm in a non-protected state (in this case, the device is at a normal working temperature).

The electrical device, according to an embodiment of the present invention, is especially suitable for a spot welding and lead-free reflow soldering process.

According to another aspect of the present invention, a method for obtaining a positive temperature coefficient polymer material with air stability and ultralow resistance is provided. The stated method includes blending a polymer and a conductive powder at a volume ratio of 65:35 to 35:65. The stated polymer includes at least one semicrystalline polymer selected from polyolefin, a copolymer of at least one olefin and at least one non-olefinic monomer copolymerizable therewith, and a thermoformable fluorine-containing polymer. The stated conductive powder includes at least one of a transition metal carbide, a transition metal carbon silicide, a transition metal carbon aluminide and a transition metal carbon stannide. And the stated size distribution of the conductive powder satisfies: $20 > D_{100}/D_{50} > 6$.

The polymer and the conductive powder used in the above-mentioned method, according to an embodiment of the present invention, are the same as the polymer and the conductive powder in the conductive polymer composition of the present invention.

Among them, the conductive powder is preferably quasi-spherical. The spherical conductive powder is prepared by using centrifugal rotation, rotary atomization, centrifugal rotation and condensation, induction or resistance heating spheroidization, plasma spheroidization or gas atomization.

The size of the conductive powder distribution preferably satisfies: $20 > D_{100}/D_{50} > 6$. Such a size distribution may be obtained by using an airflow screening manner. For example, for the same tungsten carbide powder, a cyclonic separator may be used to separate tungsten carbide powder into products with different sizes and size distribution. In addition, two tungsten carbide powders may also be mixed according to a particular ratio, to obtain size distribution of $D_{100}/D_{50} > 6$.

In addition, the carbon content in a transition metal carbide may be controlled to obtain lower resistivity. Take tungsten carbide (WC) as an example. A carbon atom is inserted in a lattice spacing of tungsten metal, so that a gap-filled solid solution is formed with the prerequisite of not impairing the original metal lattice. In this way, tungsten carbide will have excellent electrical conductivity. Theoretically, total carbon content in pure WC is 6.18%. However, a WC phase usually contains $W_2C$ ($W_2C$ is a sub-stable state phase). When WC contains a small amount of $W_2C$, the total carbon content is reduced. Under a condition with similar particle size distribution, a carbide having lower carbon content has lower resistivity. For example, when the carbon content T.C. in tungsten carbide<6.0%, low resistance may be obtained. When T.C.>6.0%, the resistivity is higher. For titanium carbide (TiC), based on a stoichiometric ratio, the total carbon content should be 20.03%. And when the total carbon content is between 19.0% and 19.5%, the resistance is lower. Therefore, in the present invention, the carbon content in the transition metal carbide may be controlled to be less than theoretical total carbon content in a transition metal carbide MC (M is a transition metal element) of a stoichiometric ratio by 2%-5%, to obtain lower resistivity.

According to an embodiment of the present invention, blending of the polymer and the conductive powder may be implemented by using the following manner: physical blending in a high-speed mixer or melting, blending, and extrusion in an extruder (including a double-screw extruder and a reciprocal single-screw extruder). During melting, compounding, and extrusion, the temperature for melting and blending depends on a specific polymer.

By means of the above-mentioned compounding method, a polymer material with uniformly distributed conductive powder may be obtained.

The present invention further relates to a method for preparing an overcurrent protection device having a positive temperature coefficient characteristic and air stability. The stated method includes extruding a positive temperature coefficient polymer material obtained by using the above-mentioned method, and laminating the first and second electrodes.

The method for preparing an overcurrent protection device, according to an embodiment of the present invention, may further include a step of sheet cutting after lamination and steps of post-assembly such as sheet punching, cutting, and molding.

Figure 7:
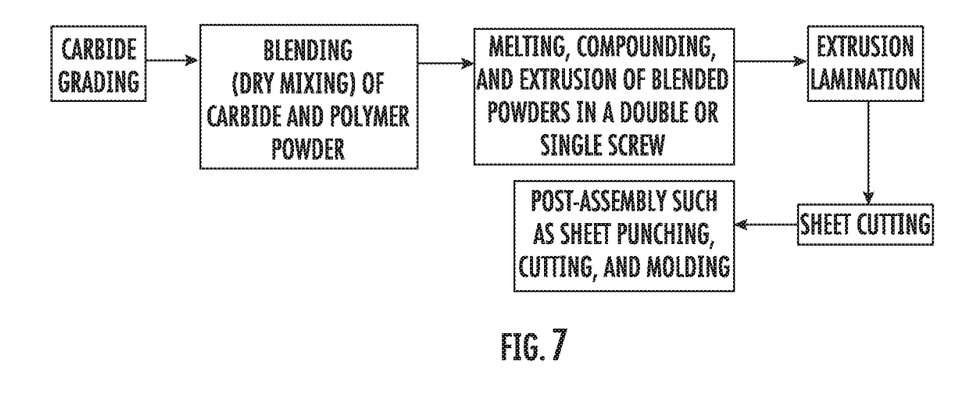
FIG. 7 is a schematic diagram of a general process procedure of preparing a PPTC device.

FIG. 7 shows a general process procedure of preparing a PPTC device. First, grade a transition metal carbide used as a conductive powder by using, for example, an airflow screening manner, to obtain a spherical carbide powder that satisfies size distribution of $D_{100}/D_{50} > 6$. Then, the carbide powder and the polymer powder are mixed (dry mixing), to obtain a blended powder. The blended powder is melted, compounded, extruded, and granulated using a double or single screw. The obtained particle material is extruded, processed, and molded to form a sheet, and the sheet then laminated with an electrode material. Then, after sheet cutting and the steps of post-assembly such as sheet punching, cutting, and molding, a PPTC device, for example, a PPTC chip is obtained.

According to an embodiment of the present invention, a conductive powder with wider size distribution, for example, $20 > D_{100}/D_{50} > 6$, produces ultralow resistivity (less than 200 μΩ·cm). In addition, choosing a spherical conductive powder can overcome processing difficulty problem for an ordinary transition metal carbide and poor dispersion in a polymer resin substrate. The processing performance of a conductive powder can be significantly improved, and a filler amount of the conductive powder may be enhanced, thereby reduce the resistance of the PPTC sheet. Moreover, for a transition metal carbide, the carbon content in the transition metal carbide may be controlled to be less than theoretical total carbon content in a transition metal carbide MC of a stoichiometric ratio by 2% to 5%, so as to obtain lower resistivity. Therefore, the present invention can provide a PPTC material having excellent processability, air stability, and ultralow resistance. Such a PPTC material can be used for preparing a PPTC device with ultralow resistance, air stability without an oxygen barrier coating.

SPECIFIC EMBODIMENTS

Several specific embodiments are shown in the following examples. It should be understood that other embodiments are considered and modifications can be made without departing from the scope or spirit of the present invention. Therefore, the following specific embodiments are not limitative.

Main raw materials used in the embodiments are summarized in Table. 1

TABLE 1

| Name | acronym | Supplier | Commodity number |
|------|---------|----------|------------------|
| Conductive nickel powder | Ni | Inco | Inco255 |

TABLE 1-continued

| Name | acronym | Supplier | Commodity number |
|---|---|---|---|
| Titanium carbide | TiC | Zhuzhou SANLI Company | FTiC-1 |
| Polyethylene | PE | Petrothene | LB8320 |
| High-density polyethylene | HDPE | MarFlex | 9607 |
| Different types of tungsten carbide powders | Chengdu | Chengdu Nuclear 857 New Materials Co., Ltd. | 1WC |
| | Japan | Japan New Metals Co., Ltd. | WC-15 WC-50 |
| | Xiamen | Xiamen Golden Egret Special Alloy Co., Ltd. | GWC030 |
| | Zaibang | Shanghai Zaibang Chemical Industry Co., Ltd. | ZBW15 |
| | Guangdong | Guangdong XiangLu Tungsten Co., Ltd. | XLWC30 |
| | Zhangyuan | Zhangyuan Tungsten Co., Ltd. | ZWC30 |

Embodiment 1—Processing Performance of Spherical WC

Figure 1:
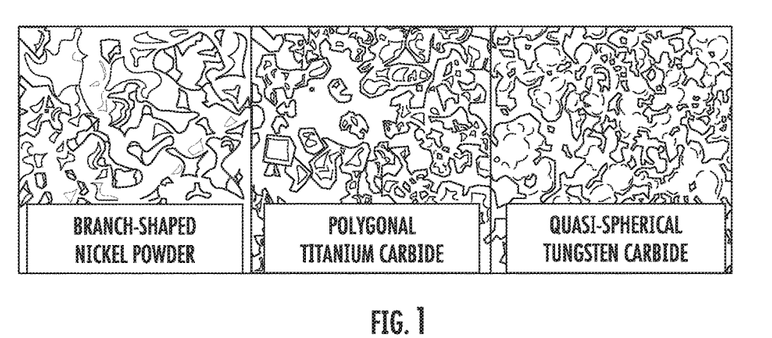
FIG. 1 shows SEM images of three conductive powders.
Figure 2:
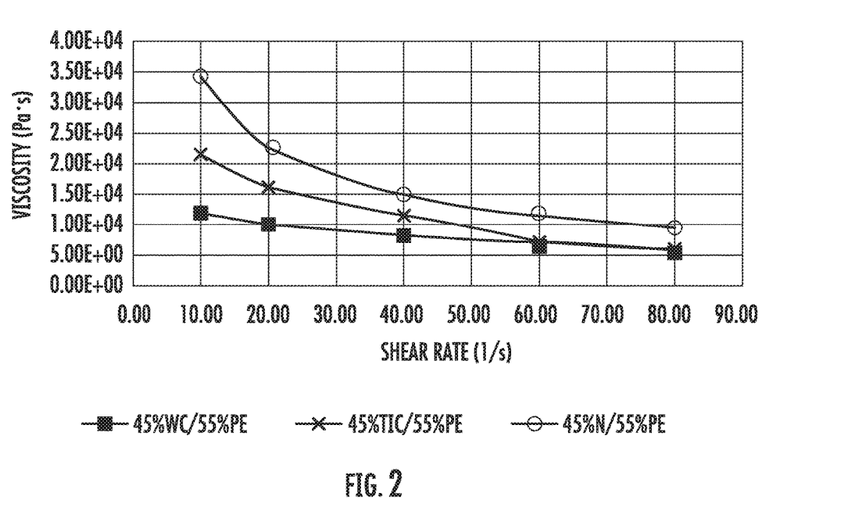
FIG. 2 shows rheological curves of composite materials of the three conductive powders and polyethylene.

A branch-shaped conductive nickel powder produced by Inco Company, polygonal TiC produced by Zhuzhou SANLI company, and a quasi-spherical WC powder produced by Chengdu Nuclear 857 New Materials Co., Ltd. are chosen. Scanning electron microscope (SEM) photos of the three are shown in FIG. 1. At an equal volume ratio (the volume proportion of the conductive powder is 45%) and under the same conditions, the branch-shaped conductive nickel powder, the polygonal TiC, and the quasi-spherical WC powder are blended, respectively with PE (polyethylene) produced by Petrothene Company, and melted and extruded, and the rheological curves of the obtained composite materials are measured. As shown in FIG. 2, under an equal volume proportion condition, the dynamic viscosity of a WC system (45% WC/55% PE) is obviously lower than that of a TiC system (45% TiC/55% PE) and that of a Ni system (45% Ni/55% PE). It indicates that the composite of tungsten carbide and polyethylene has excellent processing performance.

Embodiment 2—Resistivity and Particle-Size Distribution of Carbide

Six tungsten carbide powders having basically the same average size ($D_{50}$<5 µm) (Chengdu, Japan, Xiamen, Zaibang, Guangdong, and Zhangyuan) are chosen, and their size distributions and resistivities are measured.

Figure 3A:
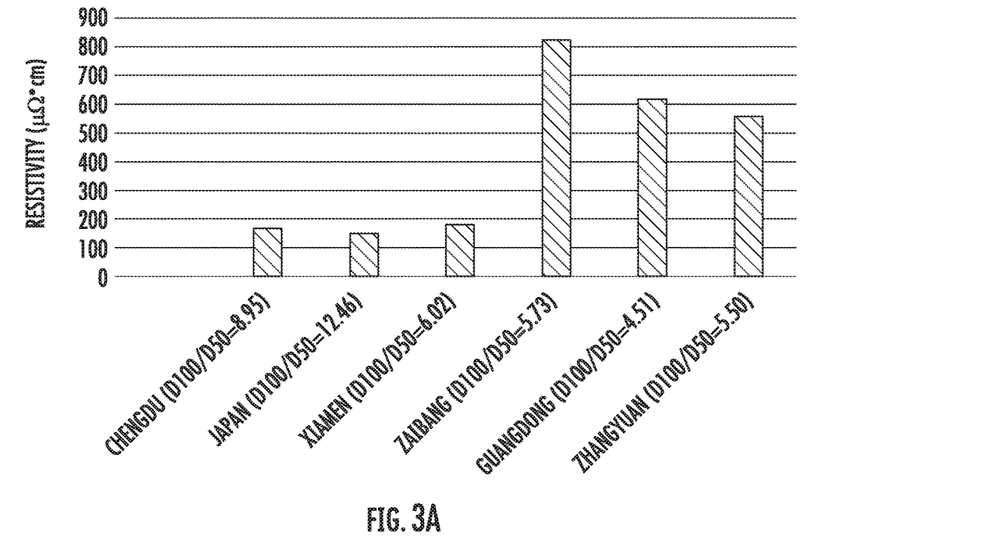
FIG. 3 shows the resistivity and size distribution of six tungsten carbide powders.
Figure 3B:
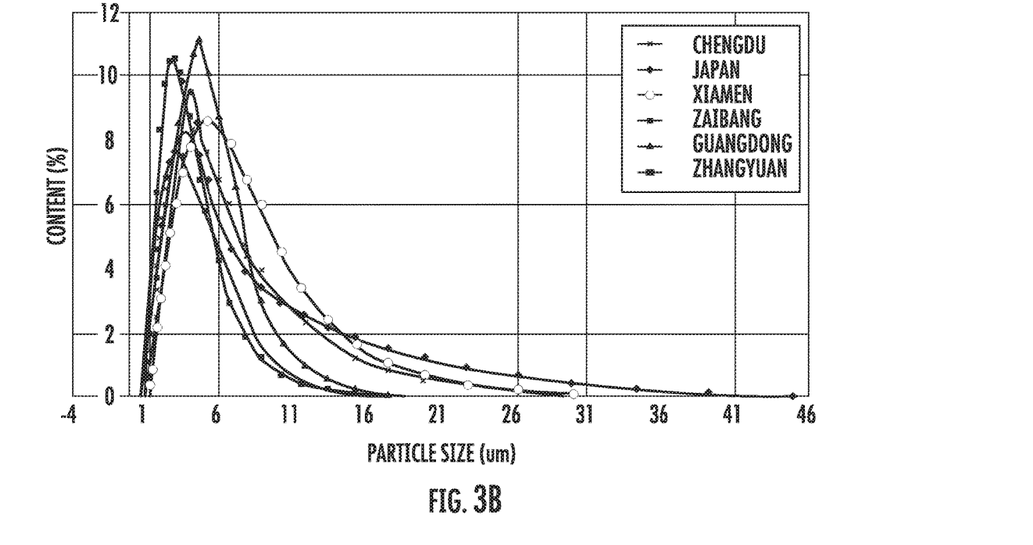

FIG. 3A shows a relationship between resistivity and size distribution of WC, and FIG. 3B is a diagram of size distribution of corresponding WC particles.

As shown in FIG. 3A, ultralow resistance is obtained for the three powders with $D_{100}/D_{50}$>6.

Embodiment 3—Resistivity and Particle-Size Distribution of Carbide

Two batches of tungsten carbide powders obtained from Chengdu Nuclear 857 New Materials Co., Ltd. are separated into products with different sizes and size distribution by using a cyclonic separator, and then a relationship between $D_{100}/D_{50}$ and resistivity is measured.

Figure 4:
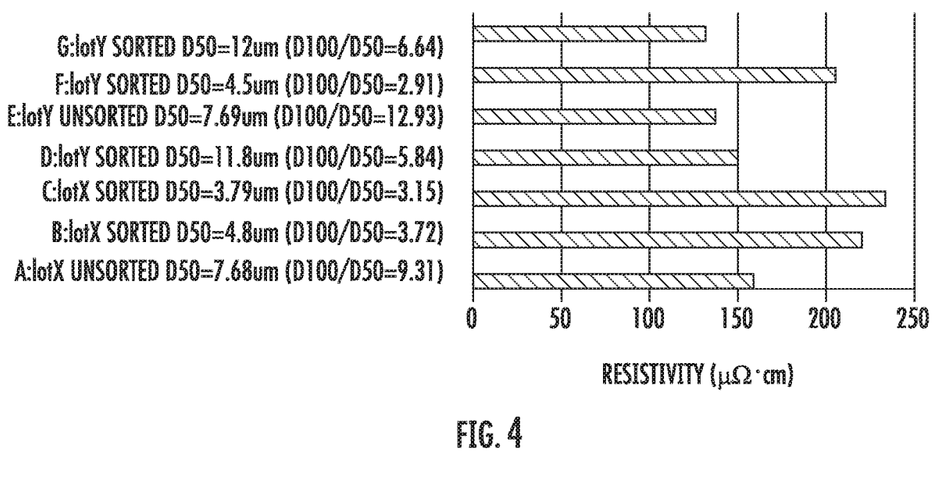
FIG. 4 shows a diagram of relationships between $D_{100}/D_{50}$ and resistivity of two batches of post-sorting tungsten carbide powders.

As shown in FIG. 4, a powder with small average particle size and narrow size distribution has greater resistivity. At $D_{50}$<5 µm, and $D_{100}/D_{50}$<6, the resistivity exceeds 200 µΩ·cm.

Embodiment 4—Resistivity and Particle-Size Distribution of Carbide

Tungsten carbide powders with two specifications (WC-15 and WC-50) from Japan New Metals Co., Ltd. are chosen and compounded at different proportions. A relationship between compounding rate and resistivity is measured.

Figure 5A:
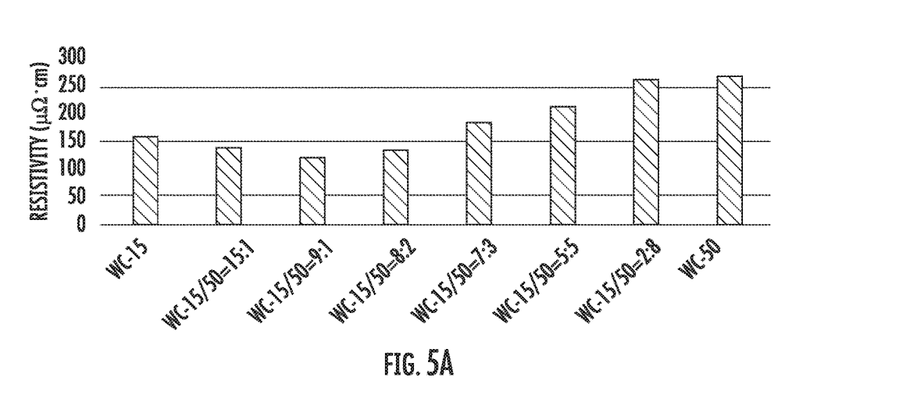
FIG. 5 shows relationships between a compounding rate and resistivity of two tungsten carbide powders having different specifications from the same manufacturer.
Figure 5B:
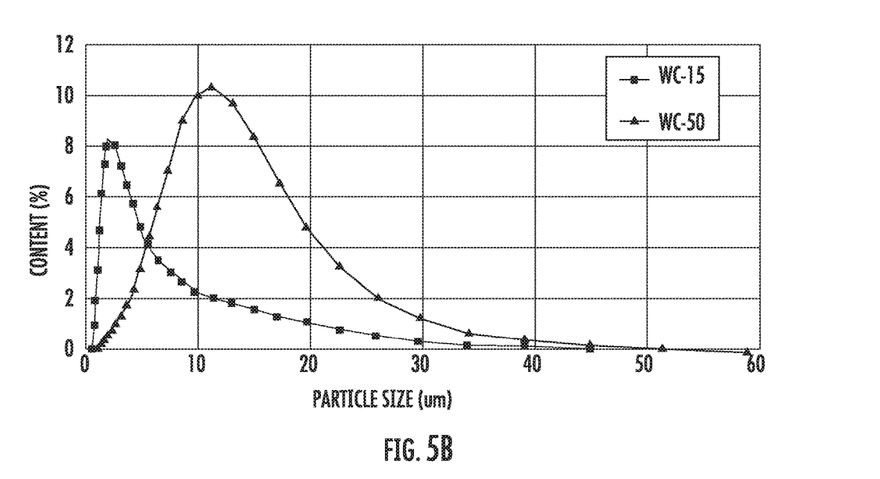

FIG. 5B shows a diagram of size distribution of two tungsten carbide powders. FIG. 5A shows the change of resistivity with the ratio of the two tungsten carbides.

As shown in FIG. 5A, the two tungsten carbide powders are compounded according to certain ratios. When a ratio of WC-15/WC-50 exceeds 5:5 (for example, WC-15/WC-50>6:4), resistivity less than 200 µΩ·cm may be obtained.

Embodiment 5—Impact of Carbon Content in Carbide on Resistivity

Two tungsten carbide powders (Xiamen-20 and Xiamen-46) from Xiamen Golden Egret Special Alloy Co., Ltd. and two tungsten carbide powders (Guangdong-17 and Guangdong-18) from Guangdong XiangLu Tungsten Co., Ltd. are chosen. The size distribution, carbon content, and resistivity of the four tungsten carbide powders are measured, respectively.

Figure 6A:
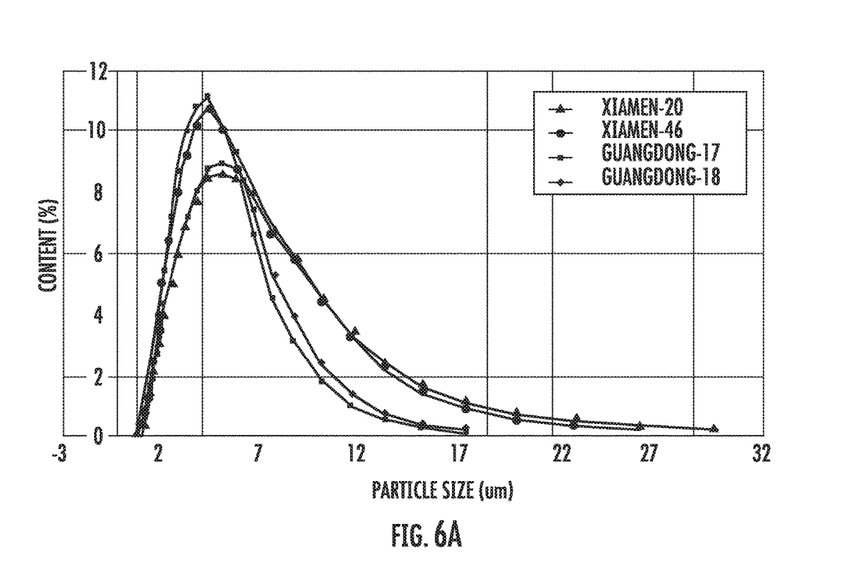
FIG. 6 shows the impact on resistivity of different total carbon (C.T.) content with the same size distribution and different total carbon (C.T.) content.
Figure 6B:
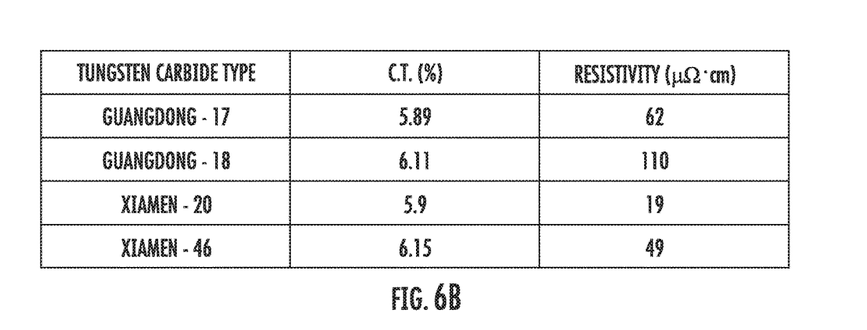

FIG. 6A shows the size distribution of the above-mentioned four tungsten carbides. FIG. 6B shows a relationship between carbon content and resistivity.

As may be seen from the result in FIG. 6, the total carbon content in WC is less than theoretical total carbon content (6.18%), because WC contains a small amount of W2C. Under a condition with similar particle size distribution, a carbide having lower carbon content has lower resistivity. When the carbon content T.C. in the tungsten carbide is <6.0% (where T.C. is 100%×C/WC by mass). Particularly, when the content T.C. is about 5.90%, low resistance may be obtained. When T.C.>6.0%, the resistivity is higher.

Embodiment 6—RT Curve of PPTC Chip

Figure 8B:
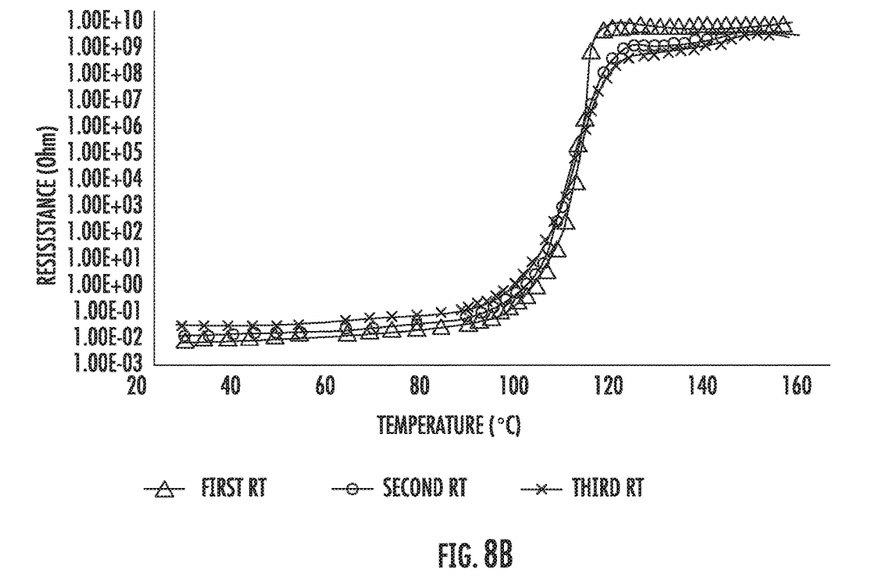

HDPE (high-density polyethylene, and Supplier: Marflex) at a volume ratio of 55% and tungsten carbide powder at a volume ratio of 45% (the average particle size is 3.58 µm, $D_{100}/D_{50}$=6.30, T.C.=5.91, and Supplier: Chengdu Nuclear 857 New Materials Co., Ltd.) are blended, melted, extruded, and covered on an electrode to produce a PPTC sheet (the resistivity is 170 µΩ·cm), so as to manufacture a chip of 2.8 mm (width)×3.6 mm (length)×0.33 mm (height). After assembly, a device (as shown in FIG. 8A) suitable for spot welding or lead-free reflow soldering is obtained. The initial resistance of the device measured is 8.5 mohm, and a resistance-temperature (RT) curve is plotted. As shown in FIG. 8B, three RT curves can be seen. The Y-axis value of RT is basically kept constant, and at the same time the temperature at which resistance turns is also basically kept constant. It shows that the RT curve of the sample in this embodiment repeats well.

Various modifications and changes made to the present invention are obvious to a person in this field without departing from the scope and spirit of the present invention.

It should be understood that the present invention is not intended to inappropriately limit exemplary embodiments and instances provided herein, and these instances and embodiments are only provided as examples, and the scope of the present invention is defined only by the appended claims.

The invention claimed is:

1. A conductive polymer composition comprising a polymer and a conductive powder at a volume ratio of 65:35 to 35:65, wherein the polymer includes at least one semicrystalline polymer selected from polyolefin, a copolymer of at least one olefin and at least one non-olefinic monomer copolymerizable therewith, and a thermoformable fluorine-containing polymer, wherein the stated conductive powder includes at least one powder of a transition metal carbide, a transition metal carbon silicide, a transition metal carbon aluminide, and a transition metal carbon stannide, and a size distribution of the conductive powder satisfies: $20 > D_{100}/D_{50} > 6$, wherein $D_{50}$ denotes a corresponding particle size when a cumulative particle-size distribution percent in the conductive powder reaches 50%, and $D_{100}$ denotes a maximum particle size.

2. The conductive polymer composition according to claim 1, wherein the stated polyolefin includes polypropylene, polyethylene or a copolymer of ethylene and propylene, the stated copolymer including at least one of ethylene-vinyl acetate copolymer, ethylene-vinyl alcohol copolymer, ethylene-methyl acrylate copolymer, ethylene-ethyl acrylate copolymer, ethylene-acrylate copolymer, and ethylene-butyl acrylate copolymer and the stated thermoformable fluorine-containing polymer including polyvinylidene fluoride or ethylene/tetrafluoroethylene copolymer.

3. The conductive polymer composition according to claim 2, wherein the stated polyethylene includes high-density polyethylene, middle-density polyethylene, low-density polyethylene or linear low-density polyethylene.

4. The conductive polymer composition according to claim 1, wherein the conductive powder is dispersed in the polymer.

5. The conductive polymer composition according to claim 1, wherein the conductive powder includes titanium carbide, tungsten carbide, titanium silicon carbide, titanium aluminum carbide or titanium tin carbide.

6. The conductive polymer composition according to claim 1, wherein the conductive powder is quasi-spherical.

7. The conductive polymer composition according to claim 1, wherein the conductive powder has $D_{50} < 5$ µm and $D_{100} < 50$ µm.

8. The conductive polymer composition according to claim 1, wherein the size distribution of the conductive powder satisfies: $10 > D_{100}/D_{50} > 6$.

9. The conductive polymer composition according to claim 1, wherein the carbon content in the transition metal carbide is less than theoretical total carbon content in a transition metal carbide MC of a stoichiometric ratio by 2% to 5%, wherein M denotes a transition metal element.

10. The conductive polymer composition according to claim 9, wherein the conductive powder is tungsten carbide WC, and carbon content T.C. in WC is 5.90% to 6.00%, wherein T.C. is 100%×C/WC by mass; or the conductive powder is titanium carbide TiC, and carbon content T.C. in TiC is 19.0% to 19.5%, wherein T.C. is 100%×C/TiC by mass.

11. A conductive polymer sheet obtained by melting and extruding the conductive polymer composition according to claim 1.

12. An electrical device, including a first electrode, a second electrode, and a conductive polymer layer sandwiched between the first and second electrodes, wherein the conductive polymer layer is formed from the conductive polymer composition according to claim 1.

13. The electrical device according to claim 12, wherein the electrical device is an overcurrent protection device with a positive temperature coefficient characteristic.

14. The electrical device according to claim 13, wherein resistivity of the overcurrent protection device in a non-protected state is less than 200 µΩ·cm.

15. A method for obtaining a positive temperature coefficient polymer material with air stability and ultralow resistance, the method comprising: blending a polymer and a conductive powder at a volume ratio of 65:35 to 35:65, wherein the polymer includes at least one semicrystalline polymer selected from polyolefin, a copolymer of at least one olefin and at least one non-olefinic monomer copolymerizable therewith, and a thermoformable fluorine-containing polymer, the stated conductive powder includes at least one powder of a transition metal carbide, a transition metal carbon silicide, a transition metal carbon aluminide, and a transition metal carbon stannide, and a size distribution of the stated conductive powder satisfies: $20 > D_{100}/D_{50} > 6$, wherein $D_{50}$ denotes a corresponding particle size when a cumulative particle-size distribution percent in the conductive powder reaches 50%, and $D_{100}$ denotes a maximum particle size.

16. The method according to claim 15, wherein the conductive powder includes titanium carbide, tungsten carbide, titanium silicon carbide, titanium aluminum carbide or titanium tin carbide.

17. The method according to claim 15, wherein the conductive powder is quasi-spherical.

18. The method according to claim 17, wherein a conductive powder of the stated quasi-spherical is prepared by using centrifugal rotation, rotary atomization, centrifugal rotation and condensation, induction or resistance heating spheroidization, plasma spheroidization or gas atomization.

19. The method according to claim 15, wherein the size distribution of the conductive powder satisfies: $10 > D_{100}/D_{50} > 6$.

20. The method according to claim 19, wherein the conductive powder is obtained by using an airflow screening manner.

21. The method according to claim 20, wherein the conductive powder is separated by using a cyclonic separator.

22. The method according to claim 19, wherein the conductive powder is obtained by compounding more than two conductive powders.

23. The method according to claim 15, wherein the carbon content in the transition metal carbide is controlled to be less than theoretical total carbon content in a transition metal carbide MC of a stoichiometric ratio by 2% to 5%, wherein M denotes a transition metal element.

24. The method according to claim 23, wherein the conductive powder is tungsten carbide WC, and carbon content T.C. in WC is 5.90% to 6.00%, wherein T.C. is 100%×C/WC by mass; or, the conductive powder is titanium carbide TiC, and carbon content T.C. in TiC is 19.0% to 19.5%, wherein T.C. is 100%×C/TiC by mass.

25. The method according to claim 15, wherein the blending includes physical mixing in a high-speed mixer or melting, blending, and extrusion in an extruder.

26. A method for preparing an overcurrent protection device with a positive temperature coefficient characteristic and air stability, the method including extruding a positive temperature coefficient polymer material obtained by using the method according to claim 15, and laminating the first and second electrodes.

27. The method according to claim 26, further including a step of sheet cutting after lamination and optional post-assembly steps, wherein the post-assembly steps include sheet punching, cutting, and molding.

\* \* \* \* \*